(12) United States Patent
Ichikawa et al.

(10) Patent No.: US 6,366,369 B2
(45) Date of Patent: Apr. 2, 2002

(54) TRANSMISSION HOLOGRAM FABRICATION PROCESS

(75) Inventors: Nobuhiko Ichikawa; Masachika Watanabe, both of Tokyo (JP)

(73) Assignee: Dai Nippon Printing Co., Ltd., Tokyo (JP)

(*) Notice: Subject to any disclaimer, the term of this patent is extended or adjusted under 35 U.S.C. 154(b) by 0 days.

(21) Appl. No.: 09/864,454

(22) Filed: May 25, 2001

(30) Foreign Application Priority Data

May 25, 2000 (JP) .......................... 2000-154497
Jul. 5, 2000 (JP) .......................... 2000-203402

(51) Int. Cl.[7] .................................. G03H 1/20
(52) U.S. Cl. .................. 359/12; 359/1; 359/20; 359/35
(58) Field of Search .................. 357/12, 15, 19, 357/20, 35

(56) References Cited

U.S. PATENT DOCUMENTS 5,499,118 A * 3/1996 Wreede et al. .............. 359/12
5,555,108 A * 9/1996 Babbitt et al. .............. 359/12
6,052,209 A * 4/2000 Nishikawa .................. 359/12

* cited by examiner

*Primary Examiner*—Darren Schuberg
(74) *Attorney, Agent, or Firm*—Sughrue Mion, PLLC

(57) ABSTRACT

The invention relates to a process capable of fabricating a variety of transmission holograms having a simple structure, a wide visible range and a large area and comprising the first stage of recording the wavefront to be finally reconstructed in the form of the first hologram that is a reflection hologram with a wide visible range, the second stage of using the first hologram to record the second hologram that is a combined reflection and transmission hologram, and the third stage of recording in the third hologram photosensitive material only a transmission hologram for reconstructing only the wavefront recorded in the second hologram and desired to be reconstructed.

36 Claims, 6 Drawing Sheets

(a)

(b)

(a)

(b)

TRANSMISSION HOLOGRAM FABRICATION PROCESS

BACKGROUND OF THE INVENTION

The present invention relates generally to a transmission hologram fabrication process, and more particularly to a novel transmission hologram fabrication process for fabricating various transmission holograms having a simple structure, a wide visible range and a large area.

The present applicant has filed a patent application (JP-A 06-308332) to come up with a hologram color filter that is a sort of transmission hologram. This hologram color filter is made up of a certain array of collective optical elements for collecting obliquely incident parallel light beams in a front direction. According to one typical fabrication process, the hologram color filter is fabricated by entering converging light from a collective lens and obliquely incident reference light into the same side of a hologram photosensitive material wherein the converging light and reference light interfere. According to another fabrication process, a computer-generated hologram (CGH) is used as a master hologram for hologram replication.

For the replication of such a transmission type of collective elemental hologram array as mentioned above, the present applicant has filed a patent application (Japanese Patent Application No. 07-249115) to propose a replication process for obtaining a hologram having the same hologram properties as those of a master hologram, wherein the master hologram is spaced away from a hologram photosensitive material by a distance equal to substantially twice as long as the focal length of each elemental hologram.

A transmission hologram scatter plate such as a transmission hologram screen, and a transmission hologram of a subject used for graphic art or the like is recorded by irradiating the front or back side of a scatter plate or a three-dimensional object that is the subject with illumination light and entering scattered light coming therefrom and reference light into the same side of a hologram photosensitive material wherein the scattered light and reference light interfere.

For the direct recording of a transmission hologram, it is thus required to enter object light coming from a transparent object corresponding to a subject (e.g., a collective lens or scatter plate) or a three-dimensional object and reference light into the same side of a hologram photosensitive material; in other words, it is impossible to record the subject while it is proximate to the hologram photosensitive material. For this reason, the resulting transmission hologram such as a transmission hologram scatter plate or graphic art has a limited visible range and so the range of the hologram, which can be observed by an observer, becomes narrow.

On the other hand, a hologram color filter is very clumsy to fabricate, because minute elemental holograms must be recorded in an array pattern while a collective lens is moved in a step-and-repeat fashion. For this reason, the hologram color filter is practically fabricated by preparing a master CGH and then applying this master CGH to a hologram replication process. However, it is not easy to fabricate large hologram color filters due to much difficulty involved in fabricating large master CGHs.

SUMMARY OF THE INVENTION

In view of such problems associated with the prior art as mentioned above, an object of the present invention is to provide a process that makes it possible to fabricate various transmission holograms having a simple structure, a wide visible range and a large area.

According to the first aspect of the invention, this object is achieved by the provision of a process for fabricating a transmission hologram which, when reconstructing illumination light is entered therein, diffracts a reconstruction wavefront in a direction opposite to the direction of incidence thereof, comprising steps of:

entering an object wavefront from a subject and a first reference wavefront into mutually opposite sides of a first hologram photosensitive material so that the object wavefront and the first reference wavefront interfere to record a reflection type of first hologram therein, disposing a second hologram photosensitive material on a side of the first hologram on which the first reference wavefront has been incident for recording the first hologram, wherein first reconstructing illumination light is entered into the first hologram through the second hologram photosensitive material to diffract a reconstruction wavefront and, at the same time, a second reference wavefront having the same wavelength is entered into a side of the first hologram that faces away from the side thereof on which the first reconstructing illumination light has been incident at an angle deviating from a Bragg diffraction condition for interference fringes recorded in the first hologram to record a second hologram therein by interference of, at least, said reconstruction wavefront and transmission light of the second reference wavefront which has transmitted through the first hologram, and disposing a third hologram photosensitive material on a side of the second hologram on which the first reconstructing illumination light has been incident for recording of the second hologram, wherein second reconstructing illumination light corresponding to the transmission light of the second reference wavefront that has transmitted through the first hologram for recording of the second hologram is entered into a side of the second hologram facing away from the third hologram photosensitive material to diffract a reconstruction wavefront to record a third hologram in the third hologram photosensitive material by interference of the reconstruction wavefront and transmission light of the second reconstructing illumination light that has transmitted through the second hologram.

Preferably in this aspect of the invention, the second reference wavefront for recording of the second hologram is the first reconstructing illumination light that has transmitted through the second hologram photosensitive material and the first hologram, and comprises a reflection wavefront reflected at reflecting means disposed on a side of the first hologram that faces away from the second hologram photosensitive material.

Preferably, the subject comprises a lens array, and said object wavefront comprises a group of converging wavefronts converged by respective lenses in said lens array.

Preferably in this case, the transmission hologram recorded in the third hologram photosensitive material by entering the second reference wavefront for recording of the second hologram into the second hologram photosensitive material at a given oblique angle of incidence is a hologram color filter.

Preferably, the first hologram is recorded as a Denisyuk type of reflection hologram of a reflective scatter type subject.

Preferably, the first hologram has been recorded as a reflection hologram of a scatter plate.

Preferably, the first hologram has been recorded as a reflection hologram of a transmissive body obtained by putting a lens array and a Fresnel lens on upon another.

Preferably, the transmission hologram recorded in the third hologram photosensitive material is used as a master hologram for hologram replication.

Preferably, the second hologram is replicated as a master hologram for hologram replication in the third hologram photosensitive material.

According to the second aspect of the invention, there is provided a process for fabricating a transmission hologram which, when reconstructing illumination light is entered therein, diffracts a reconstruction wavefront in a direction opposite to the direction of incidence thereof, comprising steps of:

recording a reflection type of first hologram in a first hologram photosensitive material using as object light a group of wavefronts converged or diverged by respective lenses in a lens array, disposing a second hologram photosensitive material on a side of the first hologram on which reconstructing illumination light is incident, wherein the second hologram photosensitive material is irradiated with the reconstructing illumination light and, at the same time, reference light coherent with respect to the reconstructing illumination light is entered into a side of the first hologram that faces away from a side thereof on which the reconstructing illumination light has been incident at an angle that deviates from a Bragg diffraction condition for interference fringes recorded in the first hologram to record a second hologram in the second hologram photosensitive material by interference of the reconstructing illumination light, reconstruction light from the first hologram and transmission light of said reference light that has transmitted through the first hologram, and disposing a third hologram photosensitive material on a side of the second hologram on which the reconstructing illumination light has been incident for recording of the second hologram, wherein reconstructing illumination light corresponding to the reference light for recording of the second hologram is entered into a side of the second hologram that faces away from the third hologram photosensitive material, so that a transmission hologram for reconstructing a group of converging wavefronts is recorded in the third hologram photosensitive material by interference of reconstruction light from the second hologram and transmission light of the reconstructing illumination light that has transmitted through the second hologram, and wherein:

for recording of the first hologram, illumination light is entered into a curved lens surface side of said lens array to create a group of object light wavefronts from said lens array, and a space between said lens array and said first hologram photosensitive material is filled up with a medium having a refractive index substantially equal to those of said lens array and said first hologram photosensitive material.

Preferably, the first hologram has been recorded with the first hologram located at a position substantially twice as long as a focal length of each lens in said lens array.

Preferably for recording of the first hologram, a light absorbing layer is interposed between said lens array and the first hologram photosensitive material.

Preferably in this case, the light absorbing layer has a transmittance of 50% or less.

Preferably for recording of the first hologram, a light absorbing layer is located on a side of the first hologram photosensitive material that faces away from said lens array.

Preferably in this case, the light absorbing layer has a transmittance of 50% or less.

According to the third aspect of the invention, there is provided a process for fabricating a transmission hologram which, when reconstructing illumination light is entered therein, diffracts a reconstruction wavefront in a direction opposite to the direction of incidence thereof, comprising steps of:

disposing a first hologram photosensitive material in front of a curved mirror array, wherein illumination light is entered into the curved mirror array through the first hologram photosensitive material to record a reflection type of first hologram therein by interference of the illumination light and a group of converging or diverging wavefronts reflected at respective mirrors in said curved mirror array, disposing a second hologram photosensitive material on a side of the first hologram on which reconstructing illumination light is incident, wherein the second hologram photosensitive material is irradiated with the reconstructing illumination light and, at the same time, reference light coherent with respect to the reconstructing illumination light is entered into a side of the first hologram that faces away from a side thereof on which the reconstructing illumination light has been incident at an angle that deviates from a Bragg diffraction condition for interference fringes recorded in the first hologram to record a second hologram in the second hologram photosensitive material by interference of the reconstructing illumination light, reconstruction light from the first hologram and transmission light of said reference light that has transmitted through the first hologram, and disposing a third hologram photosensitive material on a side of the second hologram on which the reconstructing illumination light has been incident for recording of the second hologram, wherein reconstructing illumination light corresponding to the reference light for recording of the second hologram is entered into a side of the second hologram that faces away from the third hologram photosensitive material, so that a transmission hologram for reconstructing a group of converging wavefronts is recorded in the third hologram photosensitive material by interference of reconstruction light from the second hologram and transmission light of the reconstructing illumination light that has transmitted through the second hologram.

Preferably for recording of the first hologram, a space between said curved mirror array and said first hologram photosensitive material is filled up with a medium having a refractive index substantially equal to that of said first hologram photosensitive material.

Preferably for recording of the first hologram, a light absorbing layer is located on a side of the first hologram photosensitive material that faces away from said curved mirror array.

Preferably in this case, the light absorbing layer has a transmittance of 50% or less.

Instead of said curved mirror array, a reflection type diffraction grating or a reflection type scatter plate may be used.

Thus, the transmission hologram fabrication process of the present invention comprises the first stage of recording the wavefront to be finally reconstructed in the form of the first hologram that is a reflection hologram with a wide visible range, the second stage of using the first hologram to record the second hologram that is a combined reflection and transmission hologram, and the third stage of recording in the third hologram photosensitive material only a transmission hologram for reconstructing only the wavefront recorded in the second hologram and desired to be reconstructed, and so enables a transmission hologram having a wide visible range and a large area to be easily fabricated. For instance, the process of the present invention can be applied to the fabrication of a hologram color filter without recourse to any CGH.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

How to fabricate the transmission hologram according to the present invention is now explained with reference to some preferred embodiments.

FIGS. 1 through 4 are illustrative of the process steps of fabricating a hologram color filter using a microlens array.

Figure 1:
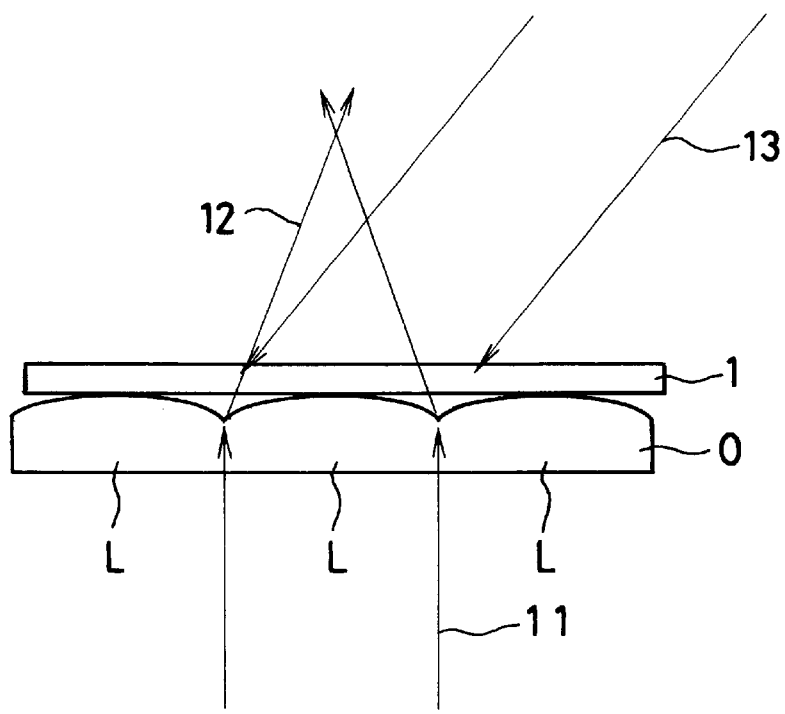
FIG. 1 is illustrative of the first process step of fabricating a hologram color filter using a microlens array according to the invention.

As shown in FIG. 1, a microlens array O defined by a regular array comprising micro-positive lenses or micro-positive cylindrical lenses is located parallel with and in proximity to or in close contact with a volume hologram photosensitive material 1 such as a photopolymer. As the lower surface of the microlens array O is irradiated with parallel illumination light 11, converging light transmits through and emerges from each microlens L. This converging light strikes as object light 12 on the lower surface of the hologram photosensitive material 1. At the same time, reference light 13 is entered into the hologram photosensitive material 1 from the other (upper) surface in a given oblique direction, so that the object light 12 and reference light 13 interfere in the hologram photosensitive material 1 to record a first hologram H1 (FIG. 2) therein. This first hologram H1 is a reflection hologram.

Figure 2:
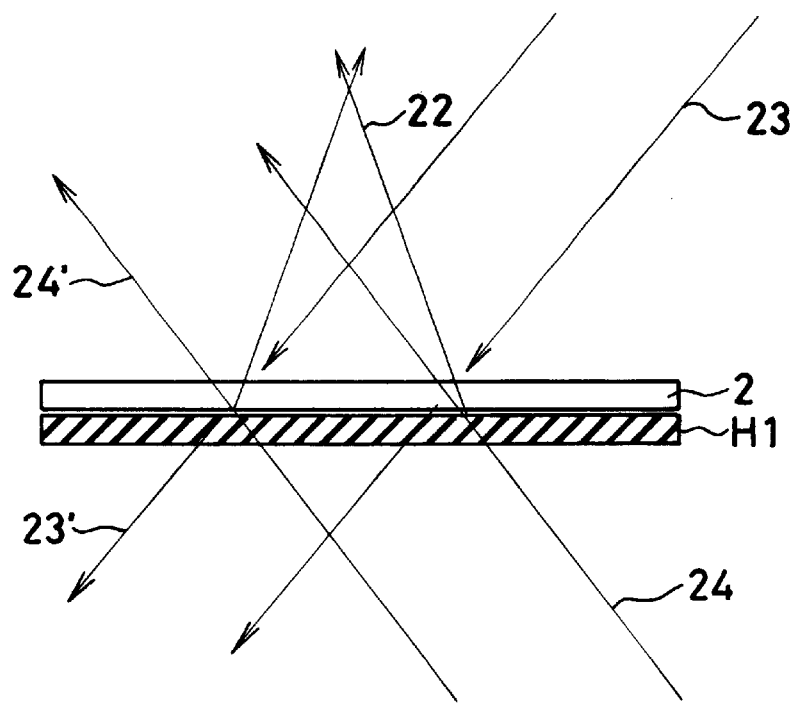
FIG. 2 is illustrative of the second process step followed by the first process step.

Then, this first hologram H1 is used to make a second hologram H2 in the arrangement of FIG. 2. To be more specific, another volume hologram photosensitive material 2 is located parallel with in proximity to or in close contact with the side of the first hologram H1 which has received the reference light 13 for recording of the first hologram H1. As reconstructing illumination light 23 having the same wavelength as that of the recording reference light 13 is entered into the first hologram H1 through the hologram photosensitive material 2 at the same angle of incidence as mentioned above, converging light 22 similar to the recording object light 12 is diffracted from the first hologram H1 toward the side of the photosensitive material 2 which has received the reconstructing illumination light 23. In this state, reference light 24 having the same wavelength as that of the reconstructing illumination light 23 is entered into the side of the photosensitive material 2 that faces away from the side of the photosensitive material 2 which has received the reconstructing illumination light 23. The angle of incidence of the reference light 24 on the first hologram H1 is selected in such a way as to be the same as the angle of incidence of illumination light on the hologram color filter to be. fabricated but deviates from the Bragg diffraction condition for interference fringes recorded in the first hologram H1. Usually, the first hologram H1 recorded in such an arrangement as shown in FIG. 1 does not satisfy the Bragg diffraction condition unless light having the same wavelength as that of the recording reference light 13 is incident thereon at the same angle of incidence or in the opposite direction. In this arrangement, three light beams, i.e., the reconstructing illumination light 23, converging light (diffraction light) 22 and light 24' of the reference light 24 that has transmitted through the first hologram H1 without being diffracted are entered into the hologram photosensitive material 2, so that fringes (1) due to the interference of the reconstructing illumination light 23 and converging (diffraction) light 22, fringes (2) due to the interference of the reconstructing illumination light 23 and transmission light 24' and fringes (3) due to the interference of the transmission light 24' and converging (diffraction) light 22 are multi-recorded therein (the second hologram H2 of FIG. 3).

Figure 3:
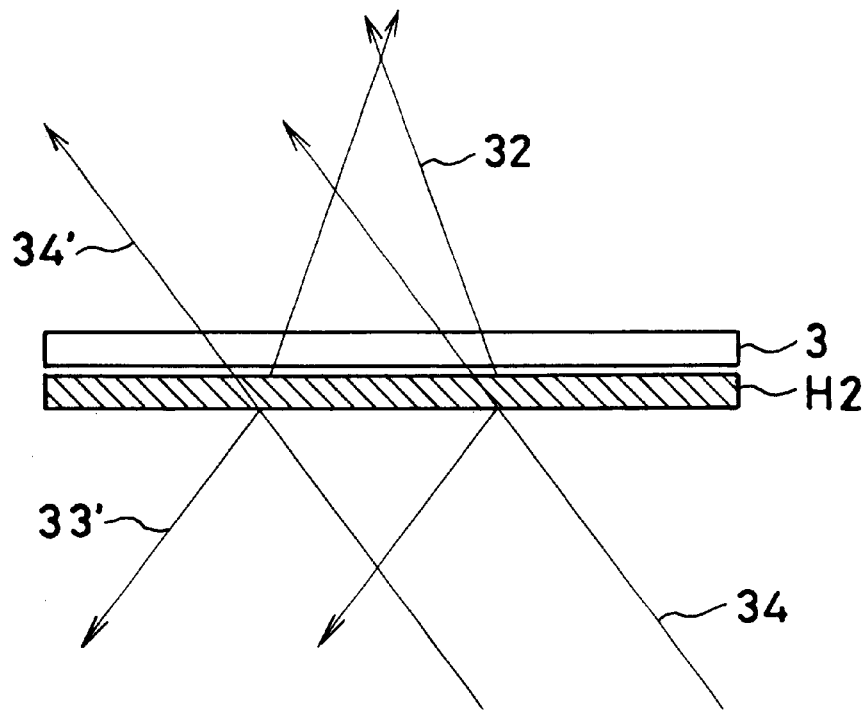
FIG. 3 is illustrative of the third process step subsequent to the second process step.

The thus recorded second hologram H2 is used to make a third hologram H3. As shown in FIG. 3, yet another hologram photosensitive material 3 is located parallel with and in proximity to or in contact with the side of the second hologram H2 that has received the reconstructing illumination light 23 for its recording. As reconstructing illumination light 34 having the same wavelength as that of the reference light 24 used to record the second hologram H2 is entered into the second hologram H2 at the same angle of incidence as that of the reference light 24, converging light 32 similar to the converging light 22 used to record the second hologram H2 is diffracted from the interference fringes (3) in the second hologram H2 toward the side of the second hologram H2 that faces away from its side that has received the reconstructing illumination light 34, and a part of the reconstructing illumination light 34 provides zero-order transmission light 34' passing through the second hologram H2. Diffraction light 33', similar to the transmission light 23' of the reconstructing illumination light 23 used to record the second hologram H2, occurs from the interference fringes (2) in the second hologram H2, leaving the side of the second hologram H2 that has received the reconstructing illumination light 34. Entered in the hologram photosensitive material 3, the transmission light 34' and converging (diffraction) light 32 interfere so that the third hologram H3 (FIG. 4) is recorded therein. This third hologram H3 is a transmission hologram that provides the hologram color filter to be fabricated.

Figure 4:
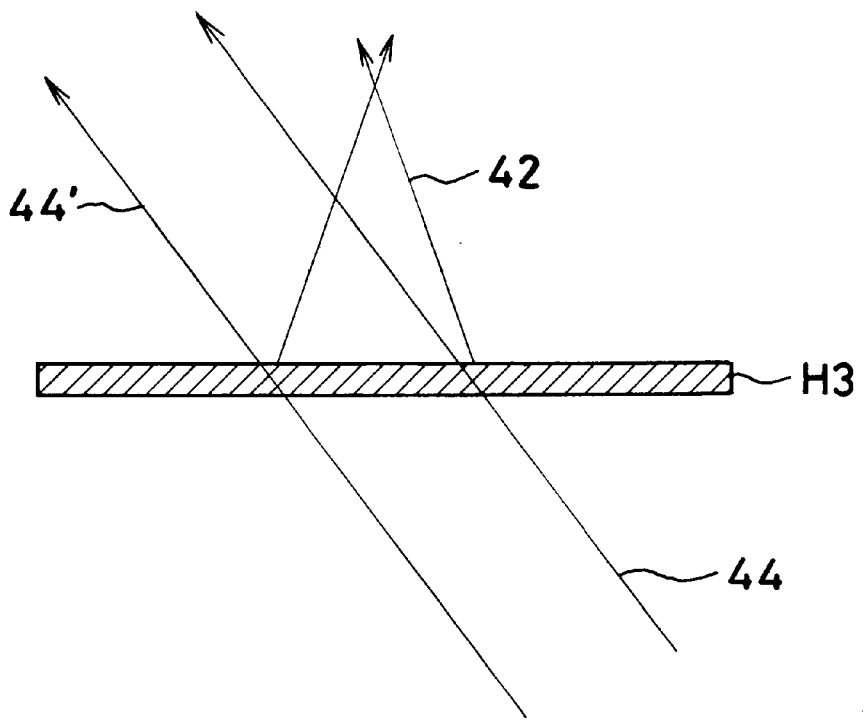
FIG. 4 is illustrative of a finally fabricated hologram color filter.

To be more specific, as the third hologram H3 is illuminated with illumination light 44 at the same angle of incidence as that of the reconstructing illumination light 34 used to record the third hologram H3 as shown in FIG. 4, a component of the illumination light 44 that has the same wavelength as that of the reconstructing illumination light 34 is diffracted as converging light 42, similar to the converging light 32, toward the transmission side. Other wavelength component of the illumination light 44 converges upon divided on both sides of the point of convergence by the wavelength dispersion action of a diffraction grating defined by interference fringes recorded in the third hologram H3. In the third hologram H3, there are additionally recorded an array of elemental holograms which are arranged at the same intervals as in the case of microlenses L in the microlens array O and have the same action. Accordingly, the third hologram H3 can be used as a hologram color filter for image displays such as liquid crystal displays (LCDs). In FIG. 4, reference numeral 44' stands for a zero-order light component of the illumination light 44 that passes through the third hologram H3 without being diffracted.

Figure 5:
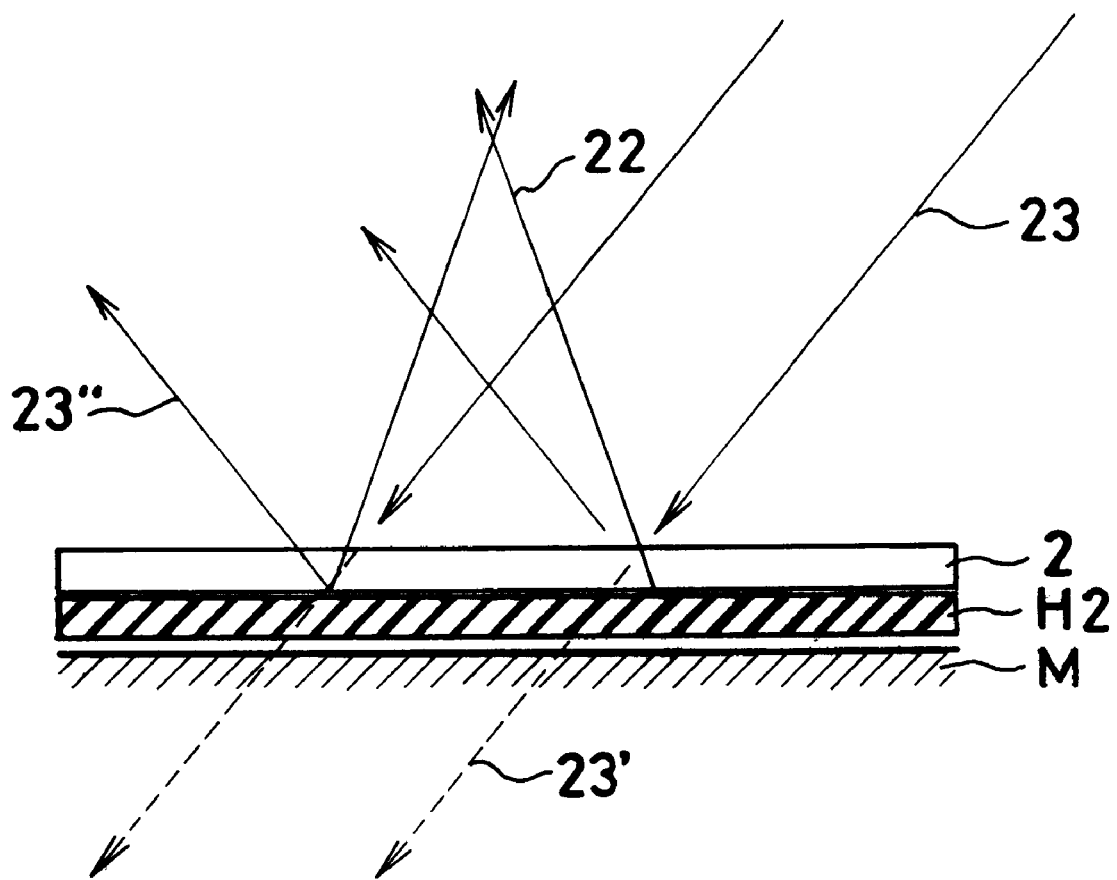
FIG. 5 is illustrative of an alternative to the second process step.

In the aforesaid arrangement of FIG. 2, the second hologram H2 is recorded in the volume hologram photosensitive material 2 by entering the reference light 24 into the side of the hologram photosensitive material 2, which faces away from its incidence side, apart from the reconstructing illumination light 23. It is understood, however, that instead of this reference light 24, it is acceptable to make use of the zero-order light of the reference light 24 that has passed straightforward through the hologram photosensitive material 2 and the first hologram H1. The arrangement to this end is illustrated in FIG. 5. In this arrangement alternative to that of FIG. 2, a plane mirror M is located on the side of the first hologram H1 that faces away from the hologram photosensitive material 2. When the plane mirror M is positioned on the side of the first hologram H1 through which the reconstructing illumination light 23 transmits, transmission light 23' passing straightforward through the hologram photosensitive material 2 and the first hologram H1 is reflected at the plane mirror M, providing reflection light 23" similar to the transmission light 24' of the reference light 24 and so forming the aforesaid interference fringes (2) and (3) in the hologram photosensitive material 2. It is here noted that, as already explained, the reference light 24 providing the transmission light 24' must be incident at the same angle of incidence of illumination light on the hologram color filter to be fabricated. In the arrangement of FIG. 5, it is thus required that the angle of plane mirror M be regulated in such a way as to meet such conditions or the angle of incidence of the reconstructing illumination light 23, i.e., the angle of incidence of the reference light 13 in the arrangement of FIG. 1 be the same as the angle of incidence of illumination light on the hologram color filter. In the latter case, the plane mirror M is located parallel with and in proximity to or in contact with the first hologram H1.

The thus fabricated third hologram H3 is a hologram lens array comprising converging elemental holograms as mentioned above, and so may be used as a hologram color filter as mentioned above. Especially when a hologram color filter for direct-vision LCDs is fabricated, it must have a large area. In consideration of some limitations on lithographic size, however, it is difficult to use a CGH or the like as a master hologram therefor. It may be possible to arrange a multiplicity of CGHs upon fabrication; however, it is difficult to keep joints between CGHs invisible. With the aforesaid process of the invention, it is possible to easily fabricate a hologram color filter for direct-vision LCDs, because a lenticular lens or a microlens array having a large area, to which one can gain relatively easy access, can be used as a master hologram and so such constraints can be removed.

In all the foregoing embodiments, the reflection type of first hologram H1 is recorded in the hologram photosensitive material 1 while the microlens array 0 is located in proximity thereto or in contact therewith. Actually, however, there must be an air spacing between the microlens array O and the hologram photosensitive material 1 because the hologram photosensitive material 1 is positioned on the curved lens surface side of the microlens array O. At an interface with air unnecessary reflection light occurs, and so unnecessary interference fringes are recorded in the hologram H1. As a result, the performance of the end product H3 becomes worse. In addition, it is difficult to fabricate a hologram array having the same focal length as that of the microlens array O and, at the same time, hologram-free regions are likely to occur, as set forth in Japanese Patent Application No. 07-249115.

Figure 6:
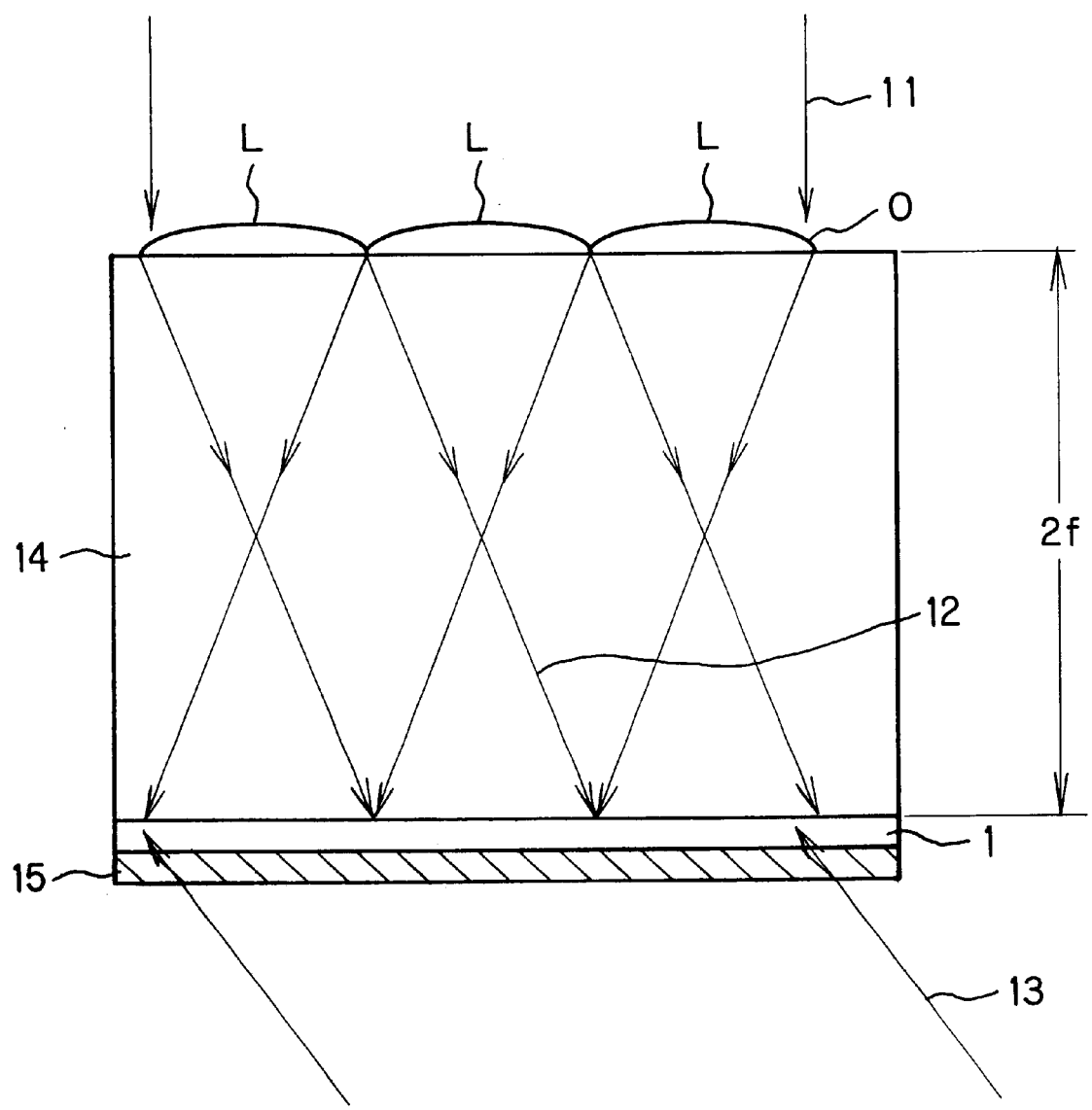
FIG. 6 is illustrative of a modification to the first process step.

Instead of the arrangement of FIG. 1, the replication process of Japanese Patent Application No. 07-249115 is used in the arrangement of FIG. 6. More specifically, a spacer 14 is interposed between the plane side of a microlens array O that faces away from its lens surface and a volume hologram photosensitive material 1 such as a photopolymer, and the space therebetween is set at substantially twice as long as the focal length f of each of micro-positive lenses or micro-positive cylindrical lenses forming the microlens array O. As the lens surface side of the microlens O is illuminated with parallel illumination light 11, converging light emerging from each microlens L diverges upon convergence on its focal plane. The resultant diverging light has at a position away from the microlens array O by almost twice as long as the focal length f the same diameter as a beam diameter at each microlens position L. Then, this diverging light is entered as object light 12 into the hologram photosensitive material 1 at this position. At the same time, reference light 13 is entered from the other (lower) surface of the hologram photosensitive material 1 thereinto in a given oblique direction, so that the object light 12 and reference light 13 interfere in the hologram photosensitive material 1, thereby recording a first hologram H1 therein. However, if reconstructing illumination light 23 is entered into the thus recorded first hologram H1 from the same direction as that of the reference light 13 used to record the first hologram H1, diverging light similar to the object light 12 used for recording the first hologram H1 occurs as diffraction light from the first hologram H1. To record the second hologram H2 of FIG. 2, it is thus required that the reconstructing illumination light 23 be entered into the hologram photosensitive material from a direction opposite to that of the recording reference light 13. Thereupon, light diffracted from the first hologram H1 propagates in the form of converging light 22 in a direction opposite to that of the object light 12 used for recording the first hologram H1. The third hologram H3 is then fabricated as shown in FIGS. 2 to 5.

In the arrangement of FIG. 6, the curved lens surface side of the microlens array O is illuminated with the illumination light 11 (whereas, in the arrangement of FIG. 1, the side of the microlens array O that faces away from its curved lens surface side is illuminated with the illumination light 11). Thus, the space between the microlens array 0 and the volume hologram photosensitive material 1 can be filled up with the spacer 14 formed of a medium having a refractive index substantially equal to those of the microlens array O and volume hologram photosensitive material 1, so that reflections at the interface therebetween can be reduced, thereby achieving efficient recording of the first hologram H1 while unnecessary interference fringes are reduced. In the arrangement of FIG. 6, however, unnecessary interference fringes may possibly be recorded in the hologram photosensitive material 1 because the object light 12 passes through the hologram photosensitive material 1, an goes back to the photosensitive layer of the hologram photosensitive material 1 upon interfacial reflection at the back side of the photosensitive material 1. Likewise, unnecessary interference fringes may possibly be recorded in the hologram photosensitive material 1 because the reference light 13 passes through the hologram photosensitive material 1, and goes back to the photosensitive layer of the hologram photosensitive material 1 upon reflections at the interfaces, etc. of the microlens array O. To prevent any possible recording of unnecessary interference fringes due to such interfacial reflections, it is preferable to locate a light absorbing layer 15 on the back surface side of the hologram photosensitive material 1, allow the spacer 14 to have the capability of absorbing light or provide a part of the spacer 14 with a light absorbing layer, thereby largely reducing interfacial reflection light making such round-trip motion. From the results of various experiments, such light absorbing layers should preferably have a transmittance of 50% or less. It is more preferable to apply an antireflection coating on the interface (the surface of the light absorbing layer 15 that faces away from the hologram photosensitive material 1) between the light absorbing layer 15 located on the back surface side of the hologram photosensitive material 1 and air, thereby preventing interfacial reflections at that interface.

Figure 7:
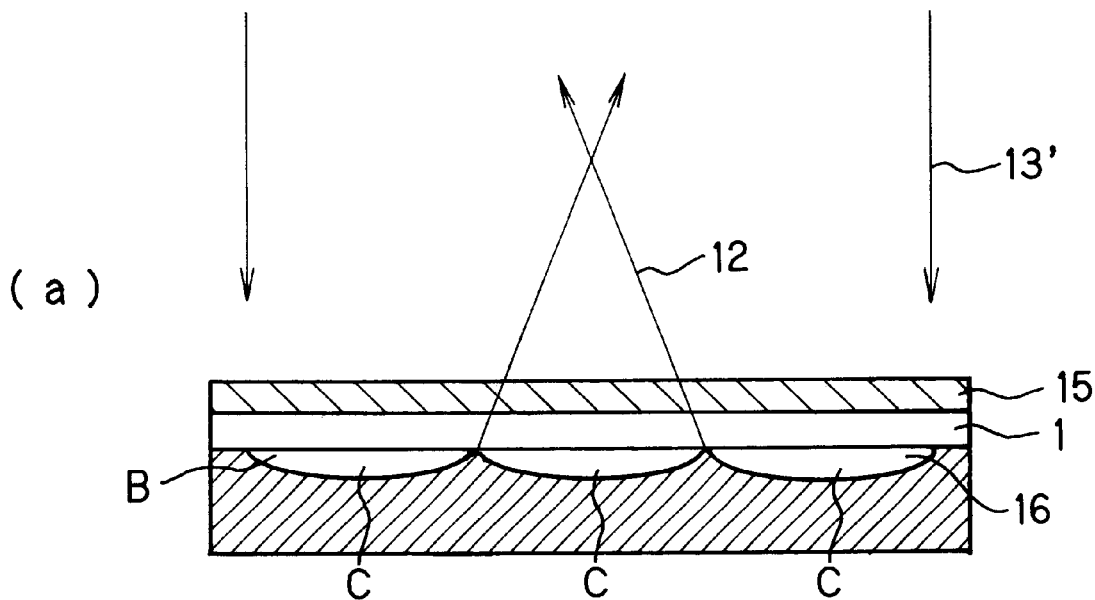
FIGS. 7(a) and 7(b) are illustrative of another modification to the first process step.
Figure 7:
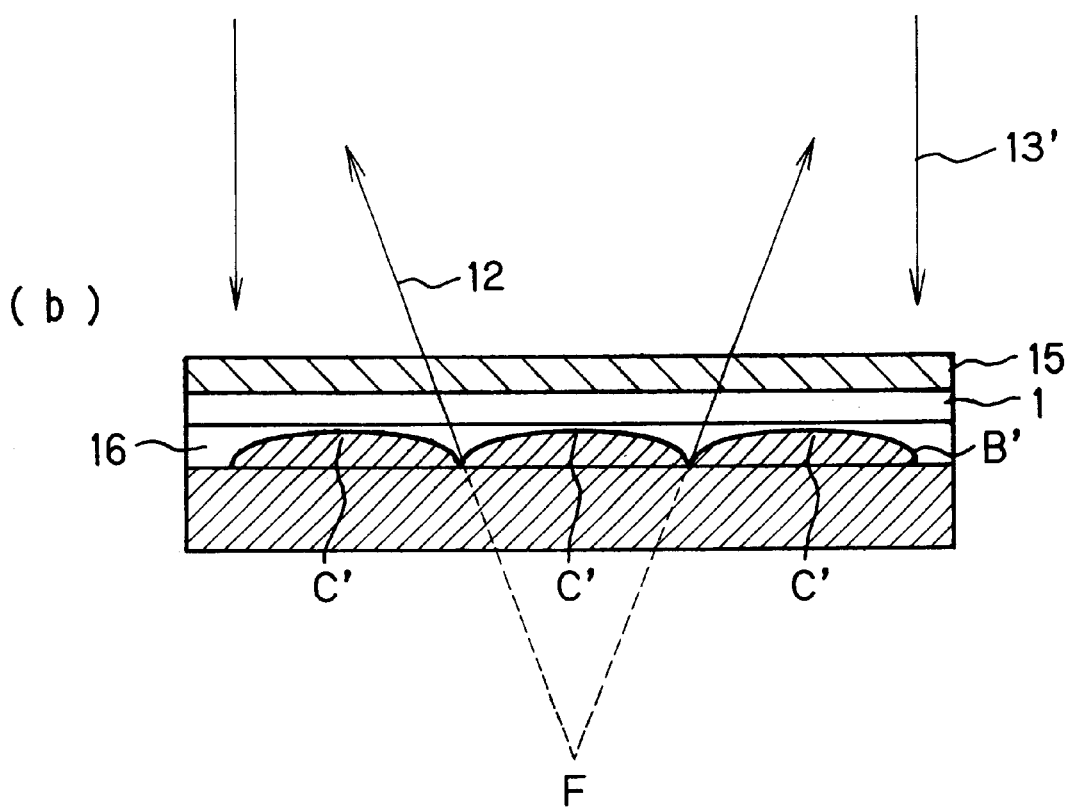

An alternative to the process of fabricating the reflection type of first hologram H1 in the arrangement of FIG. 1 is shown in FIGS. 7(*a*) and 7(*b*) wherein a micro-mirror array B, B' is used in place of the microlens array O. Referring to FIG. 7(*a*), the micro-mirror array B is a regular array comprising micro-concave mirrors or micro-cylindrical concave mirrors C. On the micro-mirror array B there is disposed a volume hologram photosensitive material substrate 1 such as a photopolymer with a medium 16 having a refractive index nearly equal to that of the substrate 1 interposed between them. The volume hologram photosensitive material substrate 1 is provided parallel with and in proximity to or in contact with the micro-mirror array B. As illumination light 13' is vertically incident on the hologram photosensitive material 1 side, the light 13' passes through the hologram photosensitive material 1 and strikes on the micro-mirror array B wherein the light 13' is converted into converging light upon reflection at each micro-concave or micro-cylindrical concave mirror C. This converging light, now acting as object light 12, is entered into the hologram photosensitive material 1 from its lower side, so that the object light 12 and incident light 13' interfere in the hologram photosensitive material 1 to record a first hologram H1 therein.

The micro-mirror array B' of FIG. 7(*b*) is a regular array comprising micro-concave mirrors or micro-cylindrical concave mirrors C'. On the micro-mirror array B' there is disposed a volume hologram photosensitive material substrate 1 such as a photopolymer with a medium 16 having a refractive index nearly equal to that of the substrate 1 interposed between them. The volume hologram photosensitive material substrate 1 is provided parallel with and in proximity to or in contact with the micro-mirror array B'. As illumination light 13' is vertically incident on the hologram photosensitive material 1 side, the light 13' passes through the hologram photosensitive material 1 and strikes on the micro-mirror array B' wherein the light 13' is reflected at each micro-concave or micro-cylindrical concave mirror C' into light diverging from each focal point F. This diverging light, now acting as object light 12, is entered into the hologram photosensitive material 1 from its lower side, so that the object light 12 and incident light 13' interfere in the hologram photosensitive material 1 to record a first hologram H1 therein. It is here appreciated that when reconstructing illumination light 23 is entered into the thus recorded first hologram H1 from the same direction as that of the recording illumination light 13', diffracted light occurring from the first hologram H1 is in the form of diverging light similar to the recording object light 12. It is thus required that to record the second hologram H2 of FIG. 2, the reconstructing illumination light 23 be entered from a direction opposite to that of the illumination light 13' used to record the first hologram H1. Light diffracted from the first hologram H1 upon incidence of such reconstructing illumination light 23 becomes converging light 22 that propagates in the direction opposite to that of the object light 12 used to record the first hologram H1.

In the embodiments of FIGS. 7(*a*) and 7(*b*), too, it is preferable to locate a light absorbing layer 15 on the light-incident side of the hologram photosensitive material 1, thereby preventing any possible recording of unnecessary interference fringes which may otherwise be caused by the object light 12 passing through the photosensitive material 1 and returning back to the photosensitive layer of the hologram photosensitive material 1 upon interfacial reflection at the back surface thereof. From the results of various experiments, this light absorbing layer should preferably have a transmittance of 50% or less. It is again more preferable to apply an antireflection coating on the interface (the surface of the light absorbing layer 15 that faces away from the hologram photosensitive material 1) between the light absorbing layer 15 and air, thereby preventing interfacial reflections at that interface.

In accordance with the arrangements of FIGS. 7(*a*) and 7(*b*) using the micro-mirror arrays B and B', it is possible to reduce the number of laser beams used to record the first hologram H1 from two to one and, hence, minimize the instability of the laser and phototaking optical system used for hologram recording due to fluctuations of coherence. It is here noted that instead of the micro-mirror array B', it is acceptable to use a microlens array just as the microlens array O of FIG. 1, which is provided on its lens surface with an aluminum or other reflective coating.

In consideration of the fact that it is difficult to fabricate a transmission hologram from a microlens array, etc. in one operation, the characteristic feature of the present invention is to obtain an easy-to-fabricate reflection hologram at the first fabrication process step (FIGS. 1, 6 and 7) and then record the properties of the original microlens array, etc. in a transmission hologram by recording diffracted light from this reflection hologram and reference light in another hologram photosensitive material (FIG. 2).

It is appreciated that if the thus fabricated third hologram H3 is used as an original transmission hologram, then it is possible to mass-produce hologram color filters according to a conventional transmission hologram replication process. Likewise, if the second hologram H2 is used as an original transmission hologram, then it is possible to mass-produce hologram color filters according to a transmission hologram replication process in the arrangement of FIG. 3.

Figure 8:
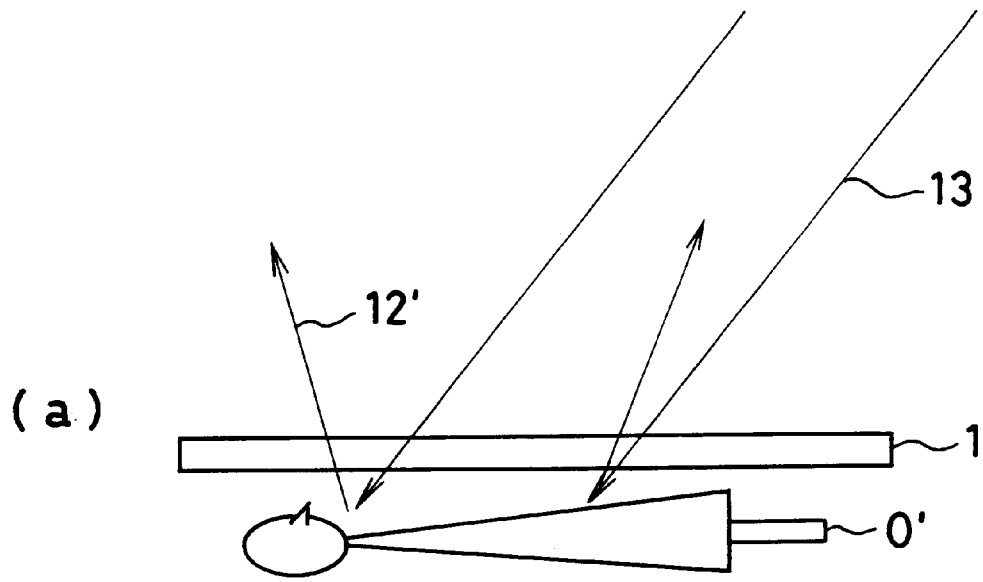
FIGS. 8(a) and 8(b) are illustrative of an alternative to the first process step, which is used for the fabrication of a transmission hologram for reconstructing an ordinary subject as well as for the fabrication of a transmission hologram scatter plate.
Figure 8:
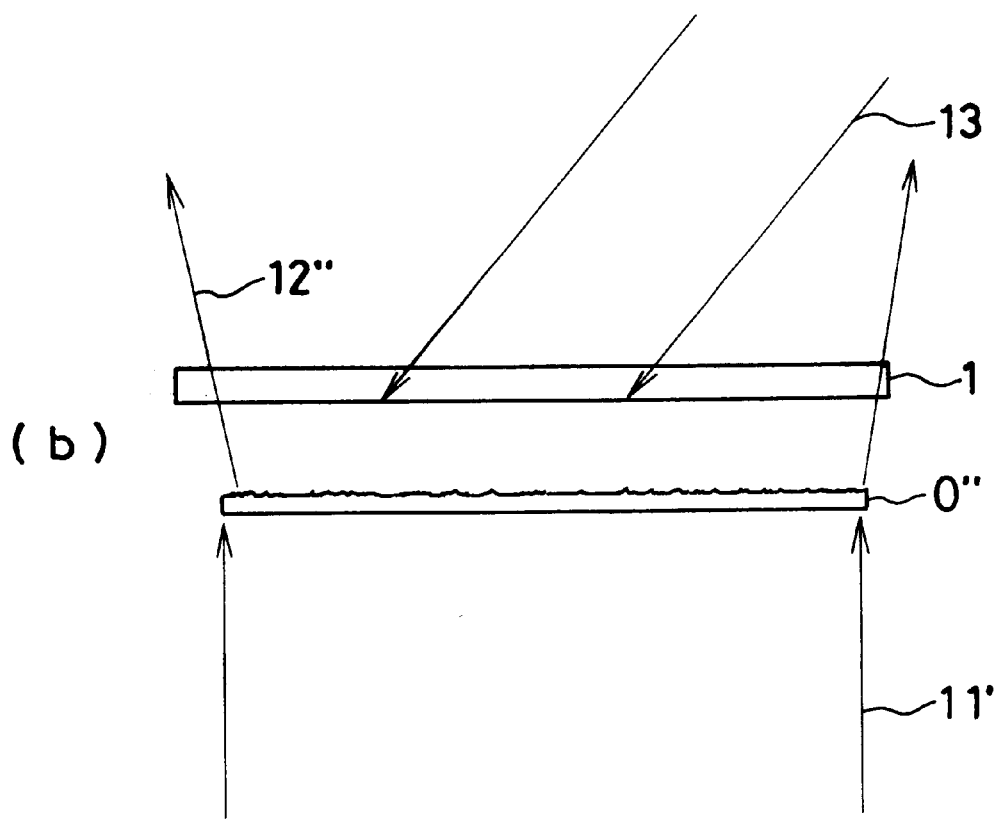

The transmission hologram fabrication process of the present invention is applicable to the fabrication of not only such hologram color filters as mentioned above but also ordinary transmission holograms for reconstructing subjects, transmission hologram scatter plates used for transmission screens, etc., and transmission screens obtained by putting lens arrays on Fresnel lenses. In these cases, the arrangements of FIGS. 2 to 5 can be immediately used whereas the arrangements of FIGS. 1 and 7 may be used with some modifications made thereto. FIG. 8(a) is illustrative of an arrangement wherein a first hologram H1 in the form of a reflection hologram is recorded from a Denisyuk type reflection hologram. To be more specific, a volume hologram photosensitive material 1 is located in front of and relatively in proximity to a reflective, scattering type subject O'. As illumination light (reference light) 13 is incident on the hologram photosensitive material 1 side from a given oblique direction, the light illuminates the object O' upon transmission through the hologram photosensitive material 1. Scattered light 12' coming from the surface of the subject is then incident on the back surface side of the hologram photosensitive material 1, so that the scattered light 12' and illumination light 13 interfere in the hologram photosensitive material 1 to record the first hologram H1 (FIG. 2) in the form of a reflection hologram. In this case, the subsequent steps (FIGS. 2 to 4) are the same as in the case of a hologram color filter. If a reflection type of diffracting grating or a reflection type of scatter plate is used as the reflective, scattering subject O', then it is possible to obtain a transmission type of diffraction grating or a transmission type of scatter plate.

In accordance with the aforesaid arrangement wherein the first hologram H1 is recorded while the subject O' is located in proximity to the hologram photosensitive material 1, the scattering angle of the scattered light 12' used for hologram recording becomes wide. Accordingly, the scattering angle of the scattered light 42 (FIG. 4) leaving the end product third hologram H3 becomes wide enough to obtain a transmission hologram having a wide visible range well fit for graphic arts or the like.

FIG. 8(b) is illustrative of an arrangement wherein a first hologram H1 is recorded as a reflection hologram from a transmission scatter plate O" such as a ground or opal glass plate. In this arrangement, a volume hologram photosensitive material 1 is positioned in front of and relatively in proximity to the transmission scatter plate O". The back surface of the transmission scatter plate O' is illuminated with illumination light 11' while illumination (reference) light 13 is entered into the hologram photosensitive material 1 from its side facing away from the scatter plate O" in a given oblique direction. Upon the back surface of the transmission scatter plate O" illuminated with the illumination light 11', scattered light 12" emerges in front of the transmission scatter plate O" and then strikes on the back surface side of the hologram photosensitive material 1, so that the scattered light 12" and illumination light 13 interfere in the hologram photosensitive material 1 to record the first hologram HI (FIG. 2) therein as a reflection hologram. In this embodiment, too, the subsequent steps (FIGS. 2 to 4) are performed as in the case of the hologram color filter.

In accordance with the aforesaid arrangement wherein the first hologram H1 is recorded while the transmission scatter plate O" is located in proximity to the hologram photosensitive material 1, the scattering angle of the scattered light 12" used for hologram recording becomes wide. Accordingly, the scattering angle of the scattered light 42 (FIG. 4) leaving the end product third hologram H3 becomes wide enough to obtain a transmission hologram having a visible range wider than could be achieved with a conventional arrangement wherein scattered light and reference light are scattered into a hologram photosensitive material from the same side for hologram recording.

In the arrangement of FIG. 8(b), too, the first hologram H1 may be recorded in the form of a Denisyuk type reflection hologram as in the arrangement of FIG. 8(a).

While the transmission hologram fabrication process of the present invention has been described with reference to some preferred embodiments, it is understood that a variety of modifications may be made thereto.

As can be appreciated from the foregoing explanations, the transmission hologram fabrication process of the present invention comprises the first stage of recording the wavefront to be finally reconstructed in the form of the first hologram that is a reflection hologram with a wide visible range, the second stage of using the first hologram to record the second hologram that is a combined reflection and transmission hologram, and the third stage of recording in the third hologram photosensitive material only a transmission hologram for reconstructing only the wavefront recorded in the second hologram and desired to be reconstructed, and so enables a transmission hologram having a wide visible range and a large area to be easily fabricated. For instance, the process of the present invention can be applied to the fabrication of a hologram color filter without recourse to any CGH.

What we claim is:

1. A process for fabricating a transmission hologram which, when reconstructing illumination light is entered therein, diffracts a reconstruction wavefront in a direction opposite to the direction of incidence thereof, comprising steps of:

entering an object wavefront from a subject and a first reference wavefront into mutually opposite sides of a first hologram photosensitive material so that the object wavefront and the first reference wavefront interfere to record a reflection type of first hologram therein, disposing a second hologram photosensitive material on a side of the first hologram on which the first reference wavefront has been incident for recording the first hologram, wherein first reconstructing illumination light is entered into the first hologram through the second hologram photosensitive material to diffract a reconstruction wavefront and, at the same time, a second reference wavefront having the same wavelength is entered into a side of the first hologram that faces away from the side thereof on which the first reconstructing illumination light has been incident at an angle deviating from a Bragg diffraction condition for interference fringes recorded in the first hologram to record a second hologram therein by interference of, at least, said reconstruction wavefront and transmission light of the second reference wavefront which has transmitted through the first hologram, and disposing a third hologram photosensitive material on a side of the second hologram on which the first reconstructing illumination light has been incident for recording of the second hologram, wherein second reconstructing illumination light corresponding to the transmission light of the second reference wavefront that has transmitted through the first hologram for recording of the second hologram is entered into a side of the second hologram facing away from the third hologram photosensitive material to diffract a reconstruction wavefront to record a third hologram in the third hologram photosensitive material by interference of the reconstruction wavefront and transmission light of the second reconstructing illumination light that has transmitted through the second hologram.

2. The transmission hologram fabrication process according to claim 1, wherein the second reference wavefront for recording of the second hologram is the first reconstructing illumination light that has transmitted through the second hologram photosensitive material and the first hologram, and comprises a reflection wavefront reflected at reflecting means disposed on a side of the first hologram that faces away from the second hologram photosensitive material.

3. The transmission hologram fabrication process according to claim 1 or 2, wherein said subject comprises a lens array, and said object wavefront comprises a group of converging wavefronts converged by respective lenses in said lens array.

4. The transmission hologram fabrication process according to claim 3, wherein the transmission hologram recorded in the third hologram photosensitive material by entering the second reference wavefront for recording of the second hologram into the second hologram photosensitive material at a given oblique angle of incidence is a hologram color filter.

5. The transmission hologram fabrication process according to claim 1 or 2, wherein the first hologram is recorded as a Denisyuk type of reflection hologram of a reflective scatter type subject.

6. The transmission hologram fabrication process according to claim 1 or 2, wherein the first hologram has been recorded as a reflection hologram of a scatter plate.

7. The transmission hologram fabrication process according to claim 1 or 2, wherein the first hologram has been recorded as a reflection hologram of a transmissive body obtained by putting a lens array and a Fresnel lens on upon another.

8. The transmission hologram fabrication process according to claim 1 or claim 2, wherein the transmission hologram recorded in the third hologram photosensitive material is used as a master hologram for hologram replication.

9. The transmission hologram fabrication process according to claim 1 or claim 2, wherein the second hologram is replicated as a master hologram for hologram replication in the third hologram photosensitive material.

10. A process for fabricating a transmission hologram which, when reconstructing illumination light is entered therein, diffracts a reconstruction wavefront in a direction opposite to the direction of incidence thereof, comprising steps of:
  recording a reflection type of first hologram in a first hologram photosensitive material using as object light a group of wavefronts converged or diverged by respective lenses in a lens array,
  disposing a second hologram photosensitive material on a side of the first hologram on which reconstructing illumination light is incident, wherein the second hologram photosensitive material is irradiated with the reconstructing illumination light and, at the same time, reference light coherent with respect to the reconstructing illumination light is entered into a side of the first hologram that faces away from a side thereof on which the reconstructing illumination light has been incident at an angle that deviates from a Bragg diffraction condition for interference fringes recorded in the first hologram to record a second hologram in the second hologram photosensitive material by interference of the reconstructing illumination light, reconstruction light from the first hologram and transmission light of said reference light that has transmitted through the first hologram, and
  disposing a third hologram photosensitive material on a side of the second hologram on which the reconstructing illumination light has been incident for recording of the second hologram, wherein reconstructing illumination light corresponding to the reference light for recording of the second hologram is entered into a side of the second hologram that faces away from the third hologram photosensitive material, so that a transmission hologram for reconstructing a group of converging wavefronts is recorded in the third hologram photosensitive material by interference of reconstruction light from the second hologram and transmission light of the reconstructing illumination light that has transmitted through the second hologram, and wherein:
  for recording of the first hologram, illumination light is entered into a curved lens surface side of said lens array to create a group of object light wavefronts from said lens array, and a space between said lens array and said first hologram photosensitive material is filled up with a medium having a refractive index substantially equal to those of said lens array and said first hologram photosensitive material.

11. The transmission hologram fabrication process according to claim 10, wherein the first hologram has been recorded with the first hologram located at a position substantially twice as long as a focal length of each lens in said lens array.

12. The transmission hologram fabrication process according to claim 10 or 11, wherein for recording of the first hologram, a light absorbing layer is interposed between said lens array and the first hologram photosensitive material.

13. The transmission hologram fabrication process according to claim 12, wherein said light absorbing layer has a transmittance of 50% or less.

14. The transmission hologram fabrication process according to claim 10 or claim 11, wherein for recording of the first hologram, a light absorbing layer is located on a side of the first hologram photosensitive material that faces away from said lens array.

15. The transmission hologram fabrication process according to claim 14, wherein said light absorbing layer has a transmittance of 50% or less.

16. A process for fabricating a transmission hologram which, when reconstructing illumination light is entered therein, diffracts a reconstruction wavefront in a direction opposite to the direction of incidence thereof, comprising steps of:
  disposing a first hologram photosensitive material in front of a curved mirror array, wherein illumination light is entered into the curved mirror array through the first hologram photosensitive material to record a reflection type of first hologram therein by interference of the illumination light and a group of converging or diverging wavefronts reflected at respective mirrors in said curved mirror array,
  disposing a second hologram photosensitive material on a side of the first hologram on which reconstructing illumination light is incident, wherein the second hologram photosensitive material is irradiated with the reconstructing illumination light and, at the same time, reference light coherent with respect to the reconstructing illumination light is entered into a side of the first hologram that faces away from a side thereof on which the reconstructing illumination light has been incident at an angle that deviates from a Bragg diffraction condition for interference fringes recorded in the first hologram to record a second hologram in the second hologram photosensitive material by interference of the reconstructing illumination light, reconstruction light from the first hologram and transmission light of said reference light that has transmitted through the first hologram, and disposing a third hologram photosensitive material on a side of the second hologram on which the reconstructing illumination light has been incident for recording of the second hologram, wherein reconstructing illumination light corresponding to the reference light for recording of the second hologram is entered into a side of the second hologram that faces away from the third hologram photosensitive material, so that a transmission hologram for reconstructing a group of converging wavefronts is recorded in the third hologram photosensitive material by interference of reconstruction light from the second hologram and transmission light of the reconstructing illumination light that has transmitted through the second hologram.

17. The transmission hologram fabrication process according to claim 16, wherein for recording of the first hologram, a space between said curved mirror array and said first hologram photosensitive material is filled up with a medium having a refractive index substantially equal to that of said first hologram photosensitive material.

18. The transmission hologram fabrication process according to claim 16 or 17, wherein for recording of the first hologram, a light absorbing layer is located on a side of the first hologram photosensitive material that faces away from said curved mirror array.

19. The transmission hologram fabrication process according to claim 18, wherein said light absorbing layer has a transmittance of 50% or less.

20. The transmission hologram fabrication process according to claim 16 or claim 17, wherein instead of said curved mirror array, a reflection type diffraction grating or a reflection type scatter plate is used.

21. The transmission hologram fabrication process according to claim 3, wherein the transmission hologram recorded in the third hologram photosensitive material is used as a master hologram for hologram replication.

22. The transmission hologram fabrication process according to claim 4, wherein the transmission hologram recorded in the third hologram photosensitive material is used as a master hologram for hologram replication.

23. The transmission hologram fabrication process according to claim 5, wherein the transmission hologram recorded in the third hologram photosensitive material is used as a master hologram for hologram replication.

24. The transmission hologram fabrication process according to claim 6, wherein the transmission hologram recorded in the third hologram photosensitive material is used as a master hologram for hologram replication.

25. The transmission hologram fabrication process according to claim 7, wherein the transmission hologram recorded in the third hologram photosensitive material is used as a master hologram for hologram replication.

26. The transmission hologram fabrication process according to claim 3, wherein the second hologram is replicated as a master hologram for hologram replication in the third hologram photosensitive material.

27. The transmission hologram fabrication process according to claim 4, wherein the second hologram is replicated as a master hologram for hologram replication in the third hologram photosensitive material.

28. The transmission hologram fabrication process according to claim 5, wherein the second hologram is replicated as a master hologram for hologram replication in the third hologram photosensitive material.

29. The transmission hologram fabrication process according to claim 6, wherein the second hologram is replicated as a master hologram for hologram replication in the third hologram photosensitive material.

30. The transmission hologram fabrication process according to claim 7, wherein the second hologram is replicated as a master hologram for hologram replication in the third hologram photosensitive material.

31. The transmission hologram fabrication process according to claim 12, wherein for recording of the first hologram, a light absorbing layer is located on a side of the first hologram photosensitive material that faces away from said lens array.

32. The transmission hologram fabrication process according to claim 31, wherein said light absorbing layer has a transmittance of 50% or less.

33. The transmission hologram fabrication process according to claim 13, wherein for recording of the first hologram, a light absorbing layer is located on a side of the first hologram photosensitive material that faces away from said lens array.

34. The transmission hologram fabrication process according to claim 33, wherein said light absorbing layer has a transmittance of 50% or less.

35. The transmission hologram fabrication process according to claim 18, wherein instead of said curved mirror array, a reflection type diffraction grating or a reflection type scatter plate is used.

36. The transmission hologram fabrication process according to claim 19, wherein instead of said curved mirror array, a reflection type diffraction grating or a reflection type scatter plate is used.

\* \* \* \* \*